United States Patent
Manhart (10) Patent No.: US 10,198,800 B2
(45) Date of Patent: Feb. 5, 2019

(54) REPRESENTING A STRUCTURE OF A BODY REGION BY DIGITAL SUBTRACTION ANGIOGRAPHY

(71) Applicant: Michael Manhart, Fürth (DE)

(72) Inventor: Michael Manhart, Fürth (DE)

(73) Assignee: Siemens Healthcare GmbH, Erlangen (DE)

(*) Notice: Subject to any disclaimer, the term of this patent is extended or adjusted under 35 U.S.C. 154(b) by 159 days.

(21) Appl. No.: 15/372,480

(22) Filed: Dec. 8, 2016

(65) Prior Publication Data

US 2017/0169553 A1 Jun. 15, 2017

(30) Foreign Application Priority Data

Dec. 10, 2015 (DE) .................... 10 2015 224 806

(51) Int. Cl.
*G06T 7/174* (2017.01)
*G06T 7/254* (2017.01)
(Continued)

(52) U.S. Cl.
CPC ............... *G06T 5/50* (2013.01); *G06T 5/002* (2013.01); *G06T 7/0014* (2013.01); *G06T 7/0016* (2013.01); *G06T 7/11* (2017.01); *G06T 7/174* (2017.01); *G06T 7/254* (2017.01); *G06T 11/60* (2013.01); *G06T 2207/10016* (2013.01);
(Continued)

(58) Field of Classification Search
CPC ......... G06T 5/002; G06T 5/50; G06T 7/0012; G06T 7/0014; G06T 7/0016; G06T 7/174; G06T 7/254; G06T 2207/20182; G06T 2207/20224; G06T 2207/30101;
(Continued)

(56) References Cited

U.S. PATENT DOCUMENTS

2003/0053670 A1\* 3/2003 Hauper et al. ................ 382/130
2006/0008171 A1 1/2006 Petschnigg et al. .......... 382/254
(Continued)

FOREIGN PATENT DOCUMENTS

DE 102012220028 A1 5/2014

OTHER PUBLICATIONS

German office Action for related German Application No. 10 2015 224 806.2 dated Nov. 7, 2016, with English Translation.
(Continued)

*Primary Examiner* — Andrew W Johns
(74) *Attorney, Agent, or Firm* — Lempia Summerfield Katz LLC (57) ABSTRACT

A method is provided for representing a first structure of a body region by digital subtraction angiography. The method includes: receiving a filler image of the body region created by an angiography apparatus, which represents a second structure of the body region and the first structure with a first contrast medium concentration in the first structure; determining a mask image of the body region representing the second structure; determining a subtraction image by editing out of the second structure from the filler image by the mask image; determining a guidance image representing the first structure based on the subtraction image; reducing image noise of the subtraction image by the guidance image; and representing the first structure based on the noise-reduced subtraction image.

19 Claims, 2 Drawing Sheets

(51) Int. Cl.
  *G06T 5/50* (2006.01)
  *G06T 7/11* (2017.01)
  *G06T 5/00* (2006.01)
  *G06T 7/00* (2017.01)
  *G06T 11/60* (2006.01)

(52) U.S. Cl.
  CPC ............... *G06T 2207/10116* (2013.01); *G06T 2207/20182* (2013.01); *G06T 2207/20192* (2013.01); *G06T 2207/30101* (2013.01)

(58) Field of Classification Search
  CPC ....... A61B 6/481; A61B 6/504; A61B 6/5217; A61B 6/5258
  See application file for complete search history.

(56) References Cited

U.S. PATENT DOCUMENTS

| | | | |
|---|---|---|---|
| 2010/0208973 A1* | 8/2010 | Lienard et al. | 382/132 |
| 2012/0201439 A1 | 8/2012 | Rauch et al. | 382/130 |
| 2014/0126685 A1 | 5/2014 | Deuerling-Zheng et al. | A61B 5/0033 |
| 2014/0270437 A1 | 9/2014 | Shreiber et al. | G06T 7/0012 |
| 2015/0010221 A1* | 1/2015 | Abe | G06T 5/50 382/130 |

OTHER PUBLICATIONS

Petschnigg Georg et al., "Digital Photography with Flash and No-Flash Image Pairs", ACM Transactions on Graphics, Proceedings of SIGGRAPH, pp. 664-672, 2004.

Schafer Ronald W., "What Is a Savitzky-Golay Filter?", IEEE Signal Processing Magazine; pp. 111-117, 2011.

\* cited by examiner

FIG 1

REPRESENTING A STRUCTURE OF A BODY REGION BY DIGITAL SUBTRACTION ANGIOGRAPHY

This application claims the benefit of DE 10 2015 224 806.2, filed Dec. 10, 2015, which is hereby incorporated by reference in its entirety.

TECHNICAL FIELD

The disclosure relates to a method for representing a first structure of a body region by digital subtraction angiography. The disclosure also relates to an evaluation device for representing the first structure and to an angiography system.

BACKGROUND

Digital Subtraction Angiography (DSA) is a procedure known from the prior art for visualizing or representing structures in regions of the body of a person by diagnostic imaging methods, e.g., x-rays. Such structures to be visualized may be blood vessels in the body region. In digital subtraction angiography, a number of images following on from one another in time may be created by an angiography apparatus, e.g., an x-ray device. During this sequence of recordings, a contrast medium is injected into the vessel, through which the vessel is made visible and is mapped in the recorded images. Before the injection of the contrast medium, a so-called empty image may be recorded in such cases, which shows structures of the body region, such as bones, differing from the blood vessels. This empty image is a so-called mask image, by which the interfering structures differing from the blood vessels may be edited out in the images recorded with the contrast medium in the blood vessels, the so-called filler images. To do this, the mask image may be subtracted from the filler images. The subtraction images resulting therefrom may only still show the blood vessels filled with the contrast medium. Based on a timing curve of the contrast medium in the blood vessels, which may be determined based on the sequence of subtraction images created from the filler images and the mask image, information may be obtained about a state of the blood vessel and blocked or constricted vessels, cerebral aneurysms, or arteriovenous malformation (AVM) may be detected.

In order to compensate for a movement of the patient, through which a shift of the structures shown in the images is caused, U.S. Patent Publication No. 2012/0201439 A1 describes a method for movement compensation for images, which have been created by digital subtraction angiography. To do this, a shift vector between a recorded image of the sequence and a reference image is determined and the recorded image is corrected based on the shift vector. U.S. Patent Publication No. 2014/0270437 A1 discloses a DSA method in which no empty image or mask image is needed. Instead, only the filler images are used to create the subtraction images.

A DSA sequence may be carried out with a radiation dose of 1.2 µGray/frame at seven and a half frames per second (fps) with a duration of around ten seconds. This produces an overall radiation dose of 90 µGray. Since this radiation used for imaging may be damaging for persons, (e.g., for patients, technicians, and medical staff working on or with the angiography apparatus), it is desirable to keep the radiation dose as small as possible to reduce the radiation load for the persons in this way. To do this, low-dosage DSA methods are known from the prior art. It is problematic here that the quality of the recorded images is also reduced by the reduced radiation dose, in that the recorded images exhibit a high image noise, for example. The noisy images make it more difficult to obtain information about the state of the blood vessels.

SUMMARY AND DESCRIPTION

The scope of the present disclosure is defined solely by the appended claims and is not affected to any degree by the statements within this summary. The present embodiments may obviate one or more of the drawbacks or limitations in the related art.

An object of the present disclosure is to provide a solution as to how the image quality of images created by digital subtraction angiography may be improved.

This object is achieved by a method, an evaluation device, and an angiography system.

A method serves to represent a first structure of a body region by digital subtraction angiography. The method includes the following acts: a) Receiving at least one filler image of the body region created by an angiography apparatus, which represents a second structure of the body region and the first structure with a first contrast medium concentration in the first structure; b) Determining a mask image of the body region representing the second structure; c) Determining at least one subtraction image by editing out of the second structure from the at least one filler image by the mask image; d) Determining a guidance image representing the first structure based on the at least one subtraction image; e) Reducing image noise of the at least one subtraction image by the guidance image and f) Representing the first structure based on the at least one noise-reduced subtraction image.

In this case, at least two filler images, which respectively represent the second structure of the body region and the first structure for different contrast medium concentrations in the first structure, may be received in act a). In act c), at least two subtraction images are determined by editing the second structure out of the at least two filler images by the mask image. In act d), the guidance image is determined based on the at least two subtraction images; and in act e), the image noise of the at least two subtraction images is reduced by the guidance image. In act f), the first structure is represented based on the at least two noise-reduced subtraction images.

The first structure in the body region of a person, (e.g., a blood vessel), may be represented by the method. To this end, images of the body region of the person, (e.g., of a head), in which the blood vessel to be visualized is located, may be created or recorded respectively by the angiography apparatus of an angiography system. The angiography apparatus may be an x-ray-based angiography apparatus, which for recording the images, emits radiation, such as x-ray radiation with a low radiation dose, (e.g., 0.8 µGray/frame), to the body region. The images recorded by the angiography apparatus are provided to an evaluation device of the angiography system, for example.

In the method, the evaluation device is provided with the at least one filler image created by the angiography apparatus, e.g., with a sequence of filler images recorded after one another in time with different contrast medium concentrations. The filler image is created by an image of the body region being recorded by the angiography apparatus, the first structure of which is filled with an injected contrast medium. In the recording of the sequence of filler images in this case each of the filler images may show the same body region with the first structure for a specific contrast medium concentration. In addition, a second structure of the body region, (e.g., bone material), is also shown in the at least one filler image by the angiography apparatus in the recording of the filler image. This second structure is not to be examined as a rule and may therefore be removed from the at least one filler image. To this end, the at least one subtraction image is created, which then only still shows the first structure represented in the at least one filler image. In particular, a temporal sequence of subtraction images is created from the filler images recorded one after another in time.

The at least one subtraction image is created by the second structure being edited out by the mask image. The mask image only represents the second structure. To edit it out, the mask image, after logarithmization of the mask image and the at least one filler image, may be removed or subtracted from the at least one filler image. In such a case, the structure, (e.g., the second structure), which is present or is shown both in the filler image and in the mask image, is edited out of the filler image.

Because of the low dose of radiation emitted by the angiography apparatus for imaging, the images recorded by the angiography apparatus exhibit an image noise that worsens the image quality. In other words, the images are noisy. In order to reduce this image noise in the at least one subtraction image, (e.g., to de-noise the at least one subtraction image), the guidance image, which represents the first structure, is determined. In particular, the guidance image provides contrast information about the first structure. For de-noising, the at least one subtraction image may be weighted, for example, with a weighting function depending on the guidance image or may be locally averaged. This is also referred to as guided image filtering and corresponds to a guided spatial smoothing of the at least one subtraction image. For a sequence of a number of subtraction images, in this case, each subtraction image is de-noised with one guidance image. By the guidance image, a smoothing of the subtraction images while retaining edges, (e.g., transitions between the first structure and a background in the subtraction image), may be achieved. By the guidance image, the subtraction image is thus smoothed without any reduction in sharpness of the subtraction image. A subtraction image de-noised or noise-reduced by the guidance image shows the first structure with a high contrast. The at least one noise-reduced subtraction image may be displayed, for example, on a display device of the angiography system.

The reduction of the image noise in the subtraction images caused by the low radiation dose advantageously enables a radiation load on persons to be reduced and at the same time a high image quality for analyzing the first structure in the body region to be achieved.

It proves advantageous for a timing curve of the contrast medium concentration in the first structure of the body region to be determined based on the at least two noise-reduced subtraction images. The timing curve of the contrast medium concentration, which is also referred to as a time-contrast curve, enables a perfusion of the first structure to be visualized or mapped. To do this, a first contrast value may be determined, for example, for a picture element or pixel in the first noise-reduced subtraction image, which shows a specific volume element of the body region. In the at least one second noise-reduced subtraction image, a second contrast value may be determined for the picture element that shows the same volume element of the body region. The fact that the subtraction images are created from the filler images recorded after one another in time thus enables the timing curve of the contrast values and thus of the contrast medium concentration in the first structure to be determined. The subtraction images de-noised by the guidance image thus enable an expressive timing curve of the contrast medium concentration to be achieved.

The timing curve of the contrast medium concentration or of the time-contrast curve may be smoothed by a Savitzky-Golay filter. In other words, the sequence of the noise-reduced subtraction images is smoothed in the temporal direction by the Savitzky-Golay Filter (SGF). The Savitzky-Golay filter enables the image noise to be reduced, e.g., the time-contrast curve to be smoothed in the temporal direction without peaks in the curve being flattened out or shifted during the process. In other words, the characteristic shape of the time-contrast curve is retained and not changed. Based on this information-preserving smoothing of the curve, an evaluation of the curve, for example, to assess the state of the first structure, may be carried out more reliably.

In accordance with an advantageous form of embodiment of the method, in act a) an empty image created by the angiography apparatus without a contrast medium in the first structure is received and in act b) the mask image is determined based on the empty image and the at least one filler image. The empty image may be recorded in this case at the beginning of the recording sequence, before the contrast medium is injected into the first structure. The fact that there is no contrast medium in the first structure during the recording of the empty image means that only the second structure will be mapped on the empty image. By contrast with the prior art, not just the empty image, which only shows the second structure, is used as the mask image, but the mask image is determined from the empty image and the at least one filler image. Thus, information may be used from all created images, e.g., the empty image and all filler images. Thus, a noise-reduced mask image may be determined and thus, in an advantageous manner, image noise may already be reduced during determination of the subtraction images by the noise-reduced mask image.

In a development, for determining the mask image, the empty image and the at least one filler image are averaged over time by a weighting function depending on the empty image. In order to determine a picture element or pixel of the mask image, the corresponding picture elements of the empty images and the filler images are weighted in this case. Corresponding picture elements are to be understood here as picture elements that show the same volume element of the body region. In particular, the picture elements corresponding to one another have the same image coordinates in the images.

Thus, a weighted average of the respective picture element of the empty image and of the filler images is determined and the respective picture element value of the mask image is predetermined as the weighted average. This is also referred to as weighted averaging. The fact that the empty image and the filler images of the recording sequence have been recorded after one another in time means that the weighted averaging of the recording sequence will be carried out in the temporal direction.

Since the mask image for editing the second structure out of the filler images may merely show the second structure, the weighting is undertaken in such a way that picture elements that show the second structure are provided with a high weight, while picture elements that show the first structure, for example, are provided with a low weight. This means, for example, that the picture elements of the empty image that only show the second structure are included in the average with the value "1", while picture elements of a filler image that show the first structure made visible as a result of the contrast medium are included in the average value with a lower weight. The noise-reduced mask image may thus be determined in a simple manner.

In an example, the at least two subtraction images determined in act c) are smoothed and in act d) the guidance image is determined from the at least two smoothed subtraction images. In particular, the at least two subtraction images are smoothed by a Savitzky-Golay filter. The subtraction images are thus smoothed in the temporal direction before the determination of the guidance image by the subtraction images. This enables an improved guidance image to be determined, by which the subtraction images smoothed in the temporal direction may be spatially de-noised.

The image noise in the at least one subtraction image may be reduced in act e), depending on the guidance image, by bilateral filtering. In other words, a filter kernel depending on the guidance image, (e.g., a Gaussian kernel), is predetermined, by which the subtraction image will be de-noised. During bilateral filtering, in particular, picture element values for the at least one noise-reduced subtraction image are determined taking into account picture element values of the guidance image and taking into account picture element values of the at least one subtraction image.

In bilateral filtering, according to the prior art, a picture element value of a picture element is determined by picture element values from other picture elements being weighted depending on their spatial distance and depending on their color distance to the picture element. For this purpose, a first weighting function may be predetermined that describes a spatial distance of the picture elements of the image. The greater the spatial proximity is, the greater is the weighting. Additionally, a second weighting function may be predetermined, a so-called edge stop function, which described a structural distance of the picture elements of the image, e.g., the color distance. The greater the structural proximity or similarity is, the greater is the weight. The edge stop function enables it to be prevented that edges at which the picture elements are spatially although not structurally close, (e.g., at which the structural distance is small but the color distance is large), may be smoothed and desharpened. The application of the bilateral filter, according to the prior art, may however lead to a loss of detail information in the images.

Therefore, by contrast with the prior art, for de-noising a subtraction image, not the color distance of the picture elements in the subtraction image itself, but the color distance, (e.g., the structural distance), of picture elements in the guidance image is taken into account. In other words, the edge stop function is determined depending on the picture element values of the guidance image. For example, Gaussian kernels with a bandwidth that is dependent on the image noise may be used for the weighting functions. This bilateral filtering of an image as function of another image, (e.g., the bilateral filtering of a subtraction image as a function of the guidance image), is also referred to as joint bilateral filtering. In an advantageous manner, this enables both the image noise to be reduced in a subtraction image and details to be retained in the subtraction image.

The guidance image may be determined based on the at least one subtraction image in act d) by maximum intensity projection. In Maximum Intensity Projection (MIP), the guidance image is determined from the temporal sequence of the subtraction images based on an intensity of the picture elements of the subtraction images. For this purpose, the picture element of that subtraction image that exhibits the highest intensity may be selected from the picture elements of the temporal sequence of the subtraction images corresponding to one another. If only one filler image has been recorded and thus only one subtraction image has been created, the guidance image determined by MIP corresponds to the subtraction image. Through the selection of the picture elements with the highest intensities from the subtraction images for the guidance image, the guidance image has a high contrast enhancement and may thus be used well for de-noising the subtraction images, e.g., for de-noising subtraction images with low contrast enhancement.

In an alternative form of embodiment for determining the guidance image respective values for the standard deviation of picture element values corresponding to one another of the at least two subtraction images are determined, the values of the standard deviation are predetermined as respective picture element values for a scatter image and in act d) the guidance image is determined as a function of the scatter image. The image noise in the images created by the angiography apparatus may be dependent on an attenuation of the radiation. This means that image regions that show volume elements of the body region, in which the radiation has penetrated strong bone material, for example, exhibit a low contrast-to-noise ratio. If the image noise in this case exhibits a high intensity, the image noise may barely be reduced by determining the guidance image by maximum intensity projection. Therefore, in accordance with this form of embodiment, the standard deviation of the corresponding picture element values of the subtraction images is determined. The values of the standard deviation in this case are predetermined as picture element values for the scatter image, based on which the guidance image is determined. In this case, the scatter image may be predetermined as the guidance image, which exhibits a reduced image noise compared to the guidance image determined by maximum intensity projection.

It proves advantageous for a noise-scatter image characterizing the image noise to be determined and in act d) for the guidance image to be determined by editing out the image noise from the scatter image by the noise-scatter image. The knowledge underlying the disclosure here is that the image noise in the recording sequence is dependent on an attenuation of the radiation. This means that picture elements with a higher noise level have higher values for the standard deviation, although these do not exhibit any contrast enhancement. Therefore, the spatially varying image noise, (e.g., the pixel-dependent image noise), is to be removed from the scatter image. For this purpose, the noise-scatter image is determined, which describes the spatially varying image noise, and is taken away or subtracted from the scatter image. The image produced by the subtraction of the noise-scatter image from the scatter image is determined as the guidance image, which exhibits a high contrast-to-noise ratio.

In such cases, respective values for the standard deviation of picture element values corresponding to one another may be determined by at least two empty images created by the angiography apparatus without a contrast medium in the first structure and the values of the standard deviation may be predetermined as respective picture element values for the noise-scatter image. In accordance with this form of embodiment, a number of empty images are created by the angiography apparatus. The picture element values of the noise-scatter image are determined here as the values of the standard deviation of picture elements corresponding to one another of the at least two empty images.

It proves advantageous for the noise-scatter image to be smoothed by the bilateral filtering by a filter kernel dependent on the mask image. The edge stop function of the bilateral filter is determined here as a function of the mask image. The filter used here is thus once again a joint bilateral filter. The smoothed noise-scatter image is subtracted from the scatter image for determining the guidance image.

In an alternate form of embodiment for determining the noise-scatter image, a regression function may be predetermined and the noise-scatter image may be determined from the mask image by the regression function. The knowledge underlying the disclosure here is that the signal-dependent scattering of the image noise, (e.g., in x-ray images), is directly proportional to a number of photons and may therefore be approximated directly from the mask image. The scattering is non-linear because of the processing of the images, for example, as a result of the application of the Savitzky-Golay filter to the picture elements. Since however the processing of the images is the same for each image sequence recorded by the angiography apparatus, the regression function may be predetermined and then be provided for each recording sequence to determine the guidance image. To this end, the predetermined regression function is applied to each picture element of the mask image of a recording sequence, which has been determined, for example, from the empty image and at least one filler image of the recording sequence. A third-order polynomial may be predetermined as the regression function. This produces the advantage that a number of empty images do not have to be created in a recording sequence.

The regression function may be predetermined based on reference empty images of a body region created by the angiography apparatus without a contrast medium. This means that the regression function may be determined once based on the reference empty images for the angiography apparatus and subsequently be used for all images created by the angiography apparatus for determining de-noised subtraction images. The predetermined regression function may be stored in a memory element of the evaluation device of the angiography system. The method is thus simply designed.

An additional act (act g)) may be carried out before act c), in which deviation caused by a movement of the body region between at least two images created by the angiography apparatus created is compensated for. Through the movement of the body region, which is caused by a movement of the patient, for example, it may occur that a volume element of the body region has different positions on the image in two images recorded one after another in time. Thus, picture elements corresponding to one another in images following on from one another in time may no longer be assigned uniquely to one another based on their image coordinates. In order to prevent picture elements of consecutive images being assigned to one another incorrectly, this movement of the body region is compensated for. To this end, as described at the start, a displacement vector to a reference image may be determined for each image and the image may subsequently be corrected.

An evaluation device is provided for representing a first structure of a body region by subtraction angiography, wherein the evaluation device is designed to carry out the method.

An angiography system includes an angiography apparatus for creating images of a body region and the evaluation device. The images created by the angiography apparatus, for example, the empty image or images and the filler image or images, are provided for the evaluation device for carrying out the method and thus for representing the first structure based on the noise-reduced subtraction images.

The angiography system may also have a display device, on which the noise-reduced subtraction images may be displayed.

The forms of embodiment and their advantages presented in relation to the method apply correspondingly for the evaluation device, and for the angiography system.

BRIEF DESCRIPTION OF THE DRAWINGS

The disclosure will now be explained in greater detail based on an exemplary embodiment, and with reference to the enclosed drawings, in which.

DETAILED DESCRIPTION

In the exemplary embodiments described herein, the described components of the form of embodiment each represent individual features of the disclosure to be considered independently of one another, which respectively also develop the disclosure independently of one another and are thus to be seen individually or in combination other than that shown as an element of the disclosure. Furthermore, the form of embodiment described here is also able to be expanded by further of the features of the disclosure already described.

Figure 1:
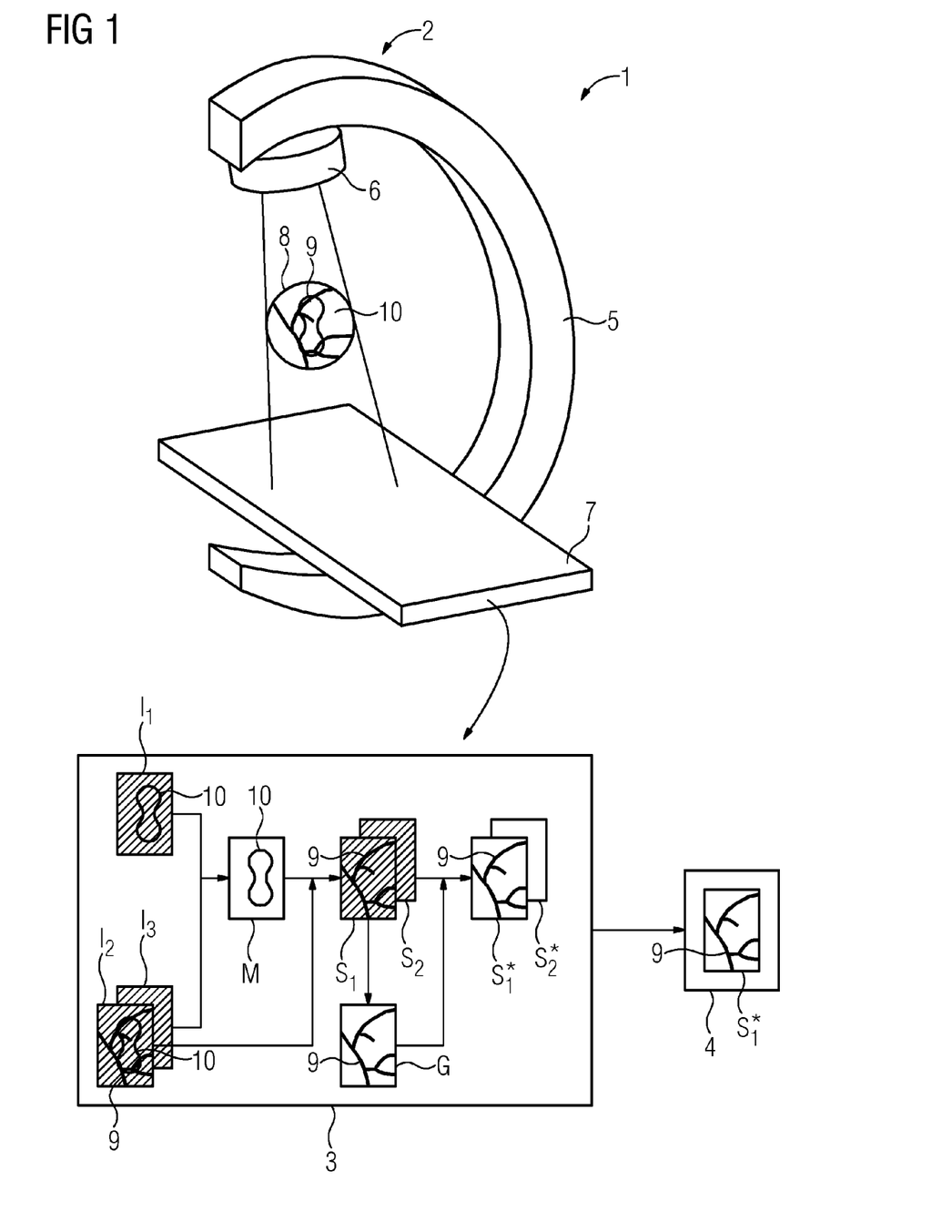
FIG. 1 depicts a schematic image of an embodiment.

FIG. 1 depicts a form of embodiment of the angiography system 1. The angiography system 1 has an angiography apparatus 2, an evaluation device 3, and a display device 4. The angiography apparatus 2 is designed to create images and may be an x-ray apparatus, which may have a C-arm 5. An x-ray source 6 for emitting x-ray radiation may be attached to one end of the C-arm 5. An x-ray detector 7 for capturing the x-ray radiation emitted by the x-ray source 6 may be attached to the opposite end of the C-arm 5. The evaluation device 3, which is designed for processing the images created by the angiography apparatus 2, may be a processor device, such as a digital processor or a computer. The display device 4 may be a screen, for example, which displays the images processed by the evaluation device 3.

A body region 8, for example, a head of a patient, may be examined by the angiography system 1. In this examination, blood vessels may be examined as a first structure 9 in the body region 8. A second structure 10, (e.g., bone material), is also present, in particular, in the body region 8 of the patient. To examine the body region 8, a recording sequence with images $I_t$ recorded after one another in time is recorded or created by the angiography apparatus 2, of which three images $I_1$, $I_2$, $I_3$ are shown here. During the recording sequence, a contrast medium is injected into the first structure 9 of the body region 8, of which the spreading out in the first structure 9 over time may be examined. Based on the timing curve of a concentration of the contrast medium, deductions may be made about a state of the blood vessels of the body region 8. In this way, vessel constrictions and vessel blockages may be recognized.

In this case, a so-called empty image $I_1$, which represents the second structure 10, may be created by the angiography apparatus 2. The first structure 9 is not shown in the empty image $I_1$ since the empty image $I_1$ was recorded without the contrast medium in the first structure 9. In addition, so-called filler images $I_2$, $I_3$ are recorded one after another in time by the angiography system 2, which show the first structure 9 for different contrast medium concentrations as well as the second structure 10. In this case, the first filler image $I_2$ may depict the first structure 9 for a first contrast medium concentration, and the second filler image $I_3$, recorded after the first filler image $I_2$ in time, may depict the first structure 9 for a second contrast medium concentration. The images $I_1$, $I_2$, $I_3$ in this case are recorded with a low radiation dose, (e.g., 0.8 μGray/frame), which causes the images $I_1$, $I_2$, $I_3$ to have a high image noise. This is visualized in FIG. 1 based on the cross-hatching in the images $I_1$, $I_2$, $I_3$.

The images $I_1$, $I_2$, $I_3$ recorded by the angiography apparatus 2 are provided to the evaluation device 3. The images $I_1$, $I_2$, $I_3$ are received in a first method act V1 of a method, which is shown based on the flow diagram in accordance with FIG. 2. In a second method act V2, the images $I_1$, $I_2$, $I_3$ may be logarithmized. In a third method act V3, a movement compensation may be carried out in the images $I_1$, $I_2$, $I_3$. This means that a displacement of the recorded body region 8 and thus of the structures 9, 10 in the images $I_1$, $I_2$, $I_3$, which was caused by a movement of the body region 8 during the recording of the image sequence, is corrected.

Figure 2:
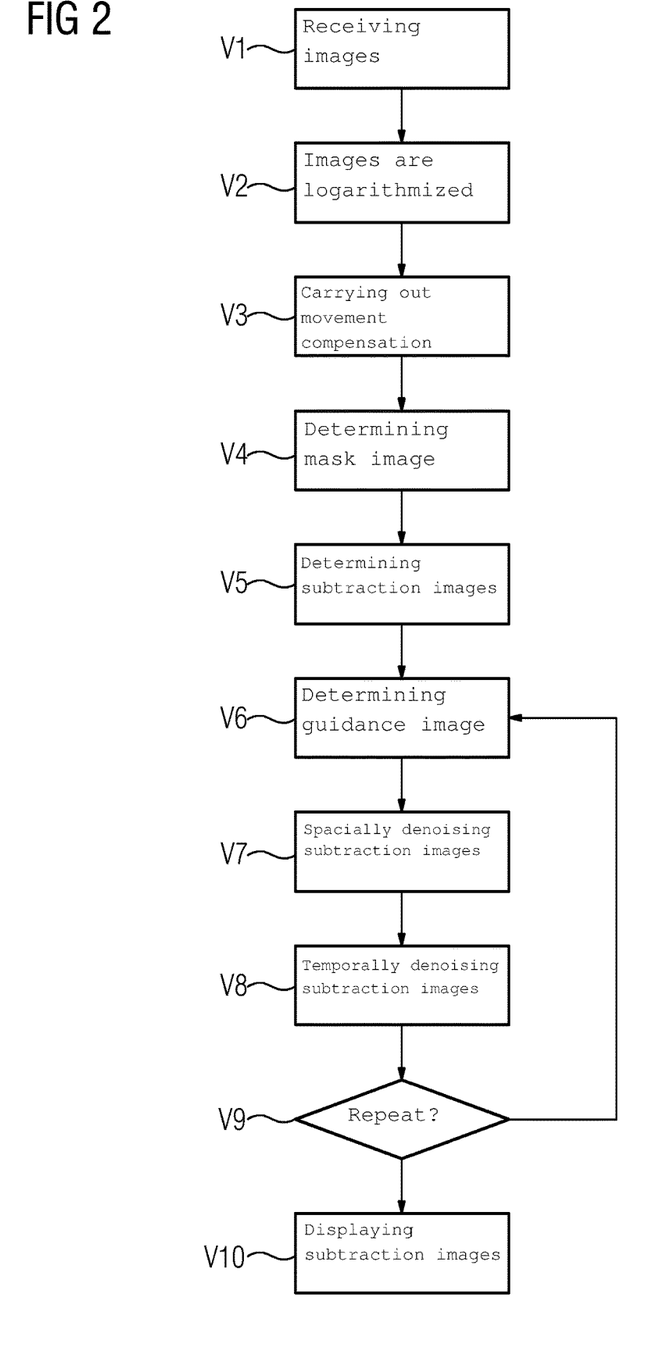
FIG. 2 depicts a schematic image of a flow diagram of an embodiment.

In a fourth method act V4, a so-called mask image M is determined, which only shows the second structure 10. The mask image M is determined in this case from the empty image $I_1$ as well as from the filler images $I_2$, $I_3$. Since the images $I_1$, $I_2$, $I_3$ are subject to noise, the mask image M is determined as a noise-reduced mask image, by a respective weighted sum of the picture element values $I_t(x, y)$ of the images $I_1$, $I_2$, $I_3$ of the recording sequence being computed as picture element values $M(x, y)$ of the mask image M:

$$M(x, y) = \sum_{t=1}^{T} w_t(x, y) I_t(x, y).$$

In this case, the image $I_t$ corresponds to the image at the point t in the recording sequence that includes t=1 . . . T images. The image $I_1$ corresponds to the empty image. $W_t(x, y)$ describes a weighting value with which the picture element value $I_t(x, y)$ of the image $I_t$ is weighted and which is dependent on the color distance of the picture element value $I_t(x, y)$ to the picture element value $I_1(x, y)$ of the empty image $I_1$. The weighting function $W_t$ may be specified as the following formula:

$$w_t(x, y) = e^{-0,5(I_t(x,y)-I_1(x,y))^2/\sigma^2} \bigg/ \sum_{t=1}^{T} e^{-0,5(I_t(x,y)-I_1(x,y))^2/\sigma^2}.$$

In this case, $\sigma^2$ corresponds to the estimated average noise energy for $I_t$-$I_1$. Since the noise level is signal-dependent, a picture element-dependent or pixel dependent noise energy $\sigma(x, y)$ may also be predetermined.

In a fifth method act V5, so-called subtraction images $S_t$ are determined, of which two subtraction images $S_1$, $S_2$ are represented here and which show the first structure 9 for different contrast medium concentrations. The subtraction images $S_1$, $S_2$ correspond to the filler images $I_2$, $I_3$, from which the second structure 10 has been edited out by the mask image M. To do this the mask image M is subtracted from the filler images $I_2$, $I_3$:

$$S_t(x,y) = I_t(x,y) - M(x,y)$$

wherein a subtraction image $S_t$ is the image at the point t in the recording sequence that has t=1 . . . T subtraction images.

These subtraction images $S_1$, $S_2$, which because of the noisy filler images $I_2$, $I_3$ likewise exhibit image noise, may be de-noised by a guidance image G. The guidance image G is determined in a sixth method act V6. To determine the guidance image G, the subtraction images $S_1$, $S_2$ may first be de-noised over time. To do this, the subtraction images $S_1$, $S_2$ may be de-noised in the temporal direction with a Savitzky-Golay filter, so that a temporally de-noised subtraction image sequence $S'_t$ is produced. The de-noising image G may be determined from the temporally de-noised subtraction images $S'_t$ in this case by Maximum Intensity Projection (MIP):

$$G(x,y) = \max_{t=1 \ldots T} S'_t(x,y)$$

In this case, the picture element value $S'_t(x, y)$ of that temporally de-noised subtraction image $S'_t$ that has the highest intensity, (e.g., the maximum intensity in the image sequence), is determined as the picture element value $G(x, y)$ of the guidance image G from the corresponding picture element values $S'_t(x, y)$. Corresponding picture element values in this case are picture element values that have the same x- and y-coordinates.

As an alternative thereto, to determine the de-noising image G, a standard deviation between the picture element values $S_t(x, y)$ of the subtraction images $S_t$ may be determined. The values of the standard deviation are predetermined as picture element values of a scatter image. In addition, a noise-scatter image may be determined, of which the picture element values are determined, for example, as the values of the standard deviation of picture element values $I_1(x, y)$ of a number of empty images $I_1$. In this case, the noise-scatter image is subtracted from the scatter image and thus produces the de-noising image G.

In a seventh method act V7, the subtraction images $S_1$, $S_2$ are spatially de-noised by the guidance image G. In other words, the image noise in the subtraction images $S_1$, $S_2$ is reduced by the guidance image G. To do this, each subtraction image $S_1$, $S_2$ is spatially averaged with a filter kernel of a bilateral filter depending on the guidance image G. By the bilateral filter, to determine the picture element values $S^*_t(x, y)$ of a noise-reduced subtraction image $S^*_t$, of which the noise-reduced subtraction image $S^*_1$, $S^*_2$ are shown here, a weighted average value of each picture element value $S_t(x, y)$ of a subtraction image $S_t$ is determined as a function of a proximity N of the picture element $S_t(x, y)$ by the following formulae:

$$S_t^*(x, y) = \frac{1}{n(x, y)} \sum_{x',y' \in N(x,y)} r(G(x, y) - G(x', y')) q(x - x', y - y') S_t(x', y'),$$

$$\text{wherein: } n(x, y) = \sum_{x',y' \in N(x,y)} r(G(x, y) - G(x', y')) q(x - x', y - y') S_t(x', y').$$

The weighting function q describes a spatial similarity of picture elements $S_t(x', y')$. To this end, the picture elements $S_t(x', y')$ are weighted based on their spatial distance to one another, e.g., the distances between the image coordinates x-x' and y-y'. The weighting function r describes the structural similarity of the picture elements $S_t(x', y')$. To this end, the picture elements $S_t(x', y')$ are weighted based on a color distance to one another. However, the color distance $G(x, y) - G(x', y')$ is determined here based on the guidance image G. By this dependency on the guidance image G, the bilateral filter is referred to as a so-called joint bilateral filter.

Gaussian kernels with respective bandwidths $\sigma^2_r$ and $\sigma^2_q$ may be used for the two weighting functions r, q. The bandwidth $\sigma^2_r$ may correspond to a noise energy of the guidance image G. Since the noise density is signal-dependent, spatially varying bandwidths $\sigma(x, y)$ may be considered.

These spatially de-noised subtraction images $S^*_t$ may be temporally de-noised in a act V8 by the Savitzky-Golay filter being applied to the images $S^*_t$. In other words, a time-contrast curve, which represents the timing curve of the contrast medium concentration in the picture elements $S^*_t(x, y)$ of the subtraction images $S^*_t$ corresponding to one another, is smoothed. By the one-dimensional Savitzky-Golay filter, the time-contrast curve is smoothed in the temporal direction in this case, without peaks being flattened out or displaced.

In a ninth method act V9, after the eighth method act V8 has been carried out, the method acts V6, V7, and V8 may be repeated. In this act, a new guidance image G may be determined based on the de-noised subtraction images $S^*_t$, for example, by MIP or by determining a scatter image and a noise-scatter image. The de-noised subtraction images $S^*_t$ may then be spatially de-noised once again in the seventh method act V7 by the new guidance image G. In order to avoid a temporal oversmoothing of the newly de-noised subtraction images $S^*_t$, the eighth method act V8 may also be skipped. In a tenth method act V10, the subtraction images $S^*_t$ may be displayed on the display device 4 of the angiography system 1.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for representing a first structure of a body region by digital subtraction angiography, the method comprising:
   receiving at least one filler image of the body region created by an angiography apparatus and an empty image created by the angiography apparatus without a contrast medium in the first structure, wherein the at least one filler image represents a second structure of the body region and the first structure with a first contrast medium concentration in the first structure;
   determining a mask image of the body region representing the second structure based on the empty image and the at least one filler image;
   determining at least one subtraction image by editing out of the second structure from the at least one filler image by the mask image;
   determining a guidance image representing the first structure based on the at least one subtraction image;
   reducing image noise of the at least one subtraction image by the guidance image; and
   representing the first structure based on the at least one noise-reduced subtraction image.

2. The method of claim 1, wherein at least two filler images are received, which respectively represent the second structure of the body region and the first structure for a different contrast medium concentration in the first structure,
   wherein at least two subtraction images are determined by editing out the second structure from the at least two filler images by the mask image,
   wherein the guidance image is determined based on the at least two subtraction images,
   wherein the image noise of the at least two subtraction images is reduced by the guidance image, and
   wherein the first structure is represented based on the at least two noise-reduced subtraction images.

3. The method of claim 2, further comprising:
   determining a timing curve of the contrast medium concentration in the first structure of the body region based on the at least two noise-reduced subtraction images.

4. The method of claim 3, further comprising:
   smoothing the timing curve of the contrast medium concentration by a Savitzky-Golay filter.

5. The method of claim 2, wherein the at least two subtraction images are smoothed, and
   wherein the guidance image is determined from the at least two, smoothed subtraction images.

6. The method of claim 5, wherein the at least two subtraction images are smoothed by a Savitzky-Golay filter.

7. The method of claim 1, wherein, in the determining of the mask image, the empty image and the at least one filler image are averaged over time by a weighting function dependent on the empty image.

8. The method of claim 1, wherein the image noise in the at least one subtraction image is reduced by bilateral filtering depending on the guidance image.

9. The method of claim 8, wherein picture element values for the at least one noise-reduced subtraction image are determined in the bilateral filtering, taking into account picture element values of the guidance image and taking into account picture element values of the at least one subtraction image.

10. The method of claim 1, wherein the guidance image is determined based on the at least one subtraction image by maximum intensity projection.

11. The method of claim 1, further comprising, before the determining of the at least one subtraction image:
    compensating for a deviation between at least two images created by the angiography apparatus caused by a movement of the body region.

12. A method for representing a first structure of a body region by digital subtraction angiography, the method comprising:
    receiving at least two filler images of the body region created by an angiography apparatus, wherein the at least two filler images respectively represent a second structure of the body region and the first structure for a different contrast medium concentration in the first structure;
    determining a mask image of the body region representing the second structure;
    determining at least two subtraction images by editing out of the second structure from the at least two filler images by the mask image;

determining respective values for a standard deviation of picture element values of the at least two subtraction images corresponding to one another, wherein the values of the standard deviation are predetermined as respective picture element values for a scatter image;

determining a guidance image representing the first structure based on the at least two subtraction images, wherein the guidance image is determined as a function of the scatter image;

reducing image noise of the at least two subtraction images by the guidance image; and representing the first structure based on the at least two noise-reduced subtraction images.

13. The method of claim 12, wherein a noise-scatter image characterizing the image noise is determined, and wherein the guidance image is determined by editing out the image noise from the scatter image by the noise-scatter image.

14. The method of claim 13, wherein respective values for the standard deviation of picture element values corresponding to one another of at least two empty images created by the angiography apparatus with contrast medium in the first structure, and wherein the values of the standard deviation are predetermined as respective picture element values for the noise-scatter image.

15. The method of claim 14, wherein the noise-scatter image is smoothed by bilateral filtering by a filter kernel dependent on the mask image.

16. The method of claim 13, wherein a regression function is predetermined and the noise-scatter image is determined by the regression function from the mask image.

17. The method of claim 16, wherein the regression function is predetermined based on the reference images of a reference body region without a contrast medium created by the angiography apparatus.

18. An evaluation device configured to represent a first structure of a body region by digital subtraction angiography, wherein the evaluation device is configured to:

receive at least one filler image of the body region created by an angiography apparatus and an empty image created by the angiography apparatus without a contrast medium in the first structure, wherein the at least one filler image represents a second structure of the body region and the first structure with a first contrast medium concentration in the first structure;

determine a mask image of the body region representing the second structure based on the empty image and the at least one filler image;

determine at least one subtraction image by editing out of the second structure from the at least one filler image by the mask image;

determine a guidance image representing the first structure based on the at least one subtraction image;

reduce image noise of the at least one subtraction image by the guidance image; and represent the first structure based on the at least one noise-reduced subtraction image.

19. An angiography system comprising:

an angiography apparatus configured to create images of a body region with an evaluation device, wherein the evaluation device is configured to:

receive at least one filler image of the body region created by an angiography apparatus and an empty image created by the angiography apparatus without a contrast medium in the first structure, wherein the at least one filler image represents a second structure of the body region and the first structure with a first contrast medium concentration in the first structure;

determine a mask image of the body region representing the second structure based on the empty image and the at least one filler image;

determine at least one subtraction image by editing out of the second structure from the at least one filler image by the mask image;

determine a guidance image representing the first structure based on the at least one subtraction image;

reduce image noise of the at least one subtraction image by the guidance image; and represent the first structure based on the at least one noise-reduced subtraction image.

* * * * *